June 16, 1953  E. G. ROEHM  2,641,969
MACHINE TOOL CONTROL MECHANISM
Filed Oct. 1, 1949  3 Sheets-Sheet 1
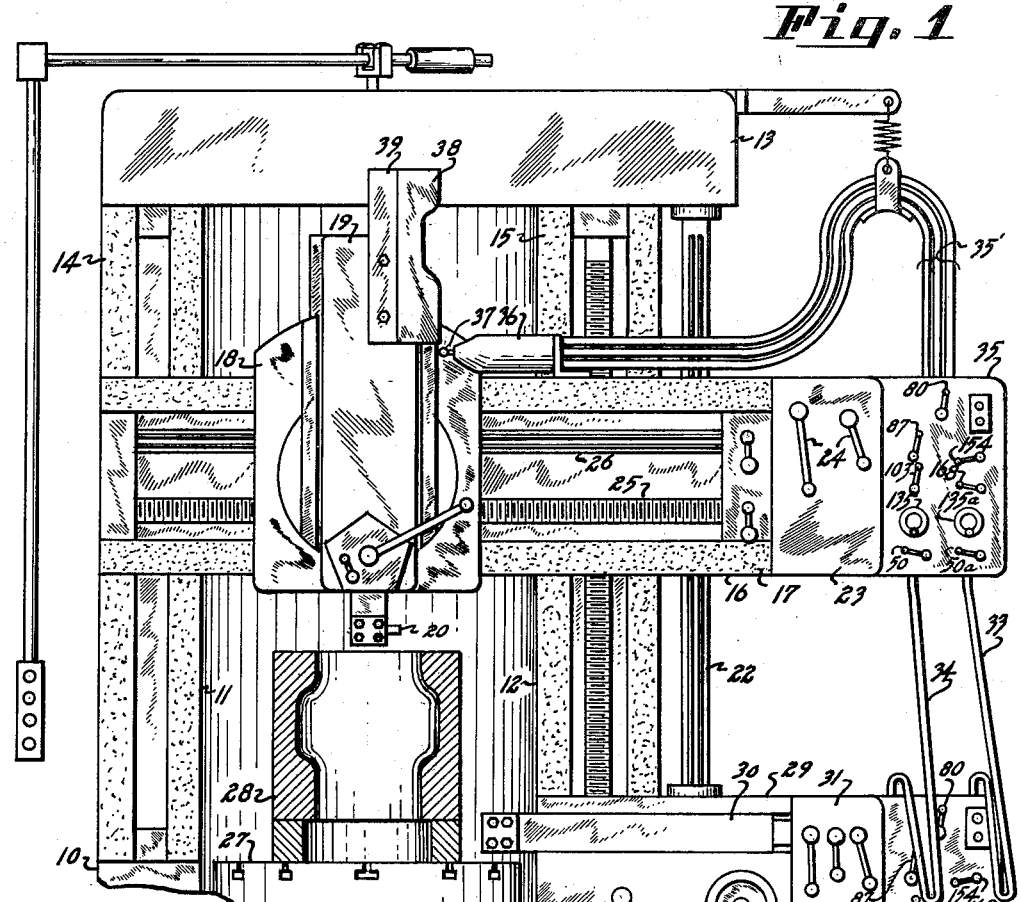
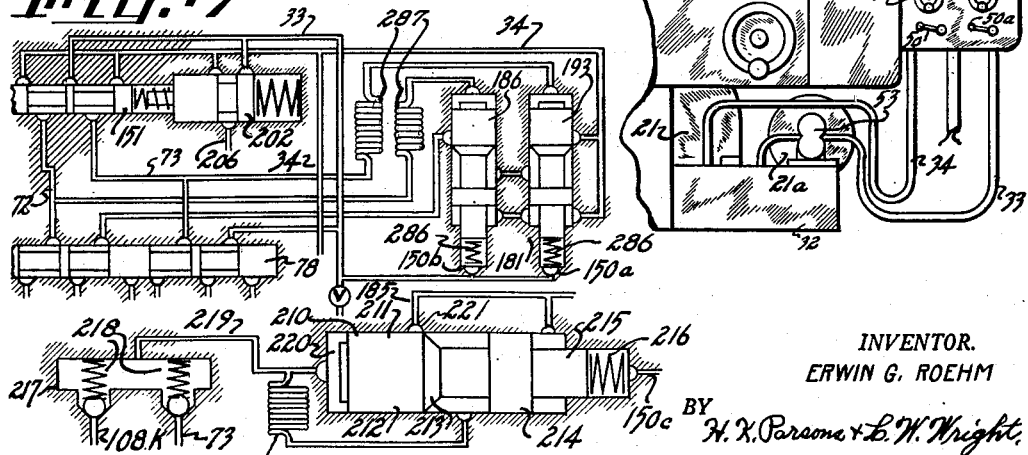
INVENTOR.
ERWIN G. ROEHM
BY H. K. Parsons & L. W. Wright
ATTORNEYS

INVENTOR.
ERWIN G. ROEHM

June 16, 1953  E. G. ROEHM  2,641,969
MACHINE TOOL CONTROL MECHANISM
Filed Oct. 1, 1949  3 Sheets-Sheet 3

INVENTOR.
ERWIN G. ROEHM
BY H. K. Paremo & C. W. Wright.
ATTORNEYS

Patented June 16, 1953

2,641,969

UNITED STATES PATENT OFFICE 2,641,969

MACHINE TOOL CONTROL MECHANISM

Erwin G. Roehm, Norwood, Ohio, assignor to The Cincinnati Milling Machine Co., Cincinnati, Ohio, a corporation of Ohio Application October 1, 1949, Serial No. 119,185

20 Claims. (Cl. 90—13.5)

This invention relates to improvements in machine tool control mechanisms and has particular reference to control mechanism for use in the production of profiled or contoured surfaces in correspondence with a master or template.

One of the objects of the present invention is the provision of an improved unitary or self-contained mechanism which is equally adaptable for embodiment in new machines or for application as an attachment to various forms of existing machine tools.

A further object of the invention is the provision of a mechanism for automatic control of a pair of relatively movable or translatable elements for determination of their respective rates of relative movement.

An additional object of the invention is the provision of a mechanism as aforesaid which will effect a substantially constant relative feed or cutting movement between a tool and work piece irrespective of the curve being followed or relative directional movement of the parts.

A further object of the invention is the provision in connection with a tracer controlled actuating mechanism for a machine tool suitable for performance of contouring or profiling operations, of means responsive to changes in operating or actuating pressure conditions of the machine for effecting variations in the relative rates of movement of the parts to insure most accurate reproduction of the controlling template and additionally to prevent damage to either work, cutter, or tracer control under fluctuating operating conditions.

An additional object of the present invention is the provision in connection with a plurality of actuating means for a machine tool slide, such as positive mechanical, hand control, and automatic control therefor, of automatic safety means for rendering the several actuators for the slide subordinate to the automatic tracer control means to prevent damage to the machine or undue stock removal from the work by the tool.

Other objects of the invention include the provision of automatic safety device means for limiting potential utilization of rapid traverse mechanism for relative shifting of tool and work and additionally of safety means for stopping the power actuating of the machine on overdeflection of the automatic tracer control mechanism.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Throughout the several views of the drawings similar reference characters are employed to denote the same or similar parts.

Figure 1 represents a fragmentary front elevation of a boring mill indicating the application of the present invention thereto.

Figure 6 is a fragmentary view of an alternatively employable control circuit and its valving.

Figures 7 and 8 are similar diagrammatic views illustrating other alternatively employable control circuits and valving.

Figure 2:
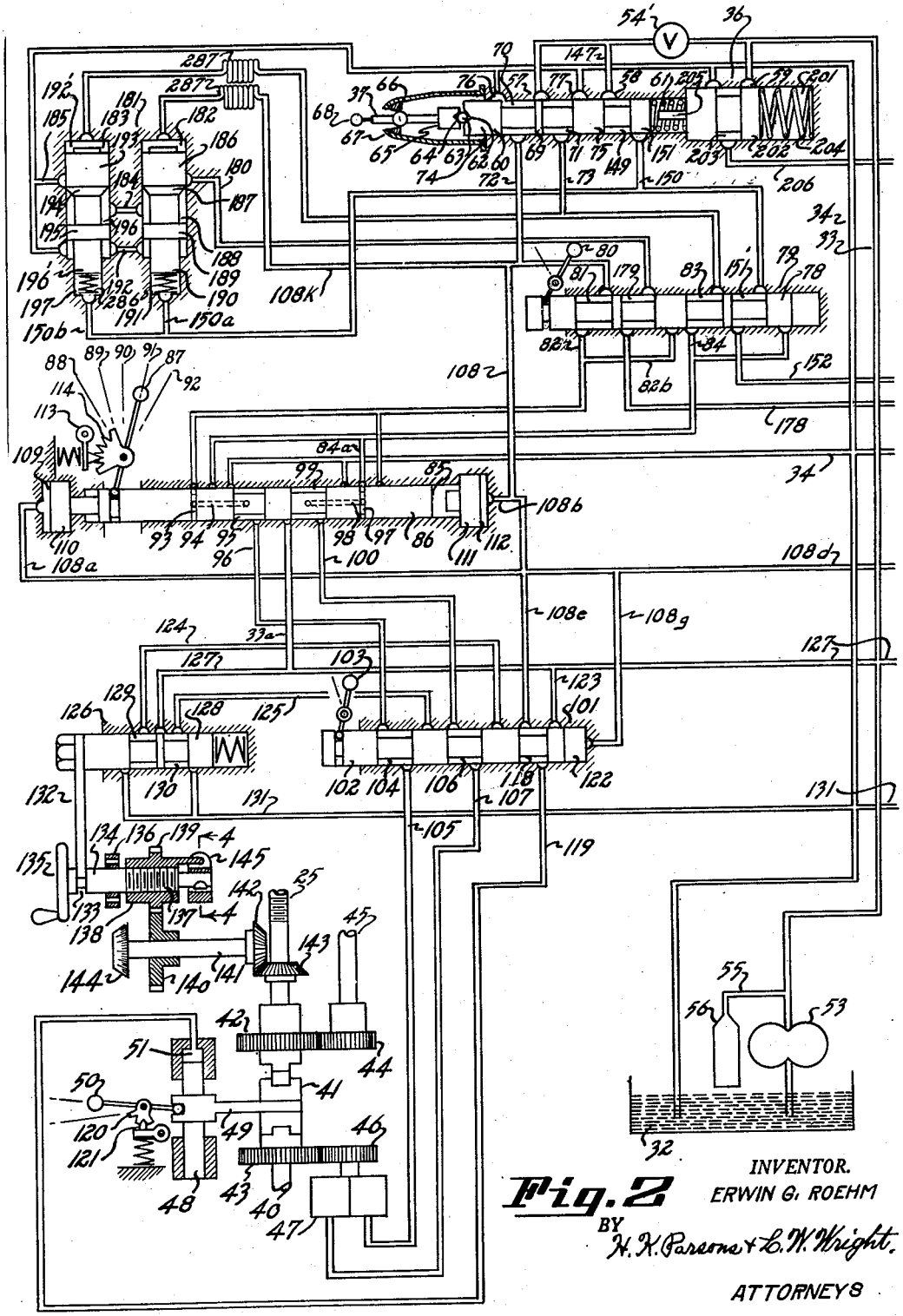
Figures 2 and 3 are diagrammatic views jointly illustrating one embodiment of the present invention.

To facilitate an understanding of the present invention the same has been illustrated as applied to a conventional type of vertical boring mill. As illustrated, this mill includes the base or body portion 10 having rising therefrom the columns 11 and 12 connected at their upper ends by the head 13 and provided with ways as at 14 and 15. Vertically movable on these ways is the rail 16 which is, in turn, provided with ways 17 guiding transverse movement of the saddle 18. Vertically movable on the saddle or cross slide 18 is a second slide or ram head 19 carrying a cutter 20.

As is conventional in machines of this type, there is provided a suitable motor drive mechanism 21, while included in the power transmission train from the motor is the shaft 22 suitably coupled with the conventional feed change mechanisms located in the box 23 secured on the end of the rail 16. Levers 24 serve to control selection of rate and direction of operation of the cross feed screw feed 25 for the saddle 18 and the spline shaft 26 for determining vertical movement of the ram head 19. The bed also supports the rotary table 27 to support and rotate the work piece such as 28. Additionally, there is shown as mounted on the column 15 the side head 29 provided with a cross slide 30, the operation of these parts being controlled by transmission mechanism in the gear box 31.

As the machine above referred to is of standard conventional commercial type, reference has been made only to its basic structural features as its particular details in themselves form no part of the present invention. It is to be understood that the present inventive subject matter may be applied not only to the particular machine shown, but to various types of existing commercial machine tools.

In Figure 1 there has been indicated as secured to the bed or base of the machine a hydraulic power unit 32 coupled by suitable hose or other conduits such as the pressure line 33 and exhaust conduit 34 with the hydraulic transmission a control unit 35 supported on rail 16 in proximity to the transmission box 23. Extending from this hydraulic control unit 35 are a plurality of conduits indicated as an entirety by the numeral 35' which are, in turn, coupled with the housing 36 of the tracer unit. This housing in the present instance is shown mounted upon rail 16 and has a projecting contact member or tracer finger 37 to engage the pattern 38 mounted on bracket 39 which is, in turn, carried by and movable with the ram head 19. The details of the hydraulic control mechanism and their intended relationship to the parts of the particular machine tool to be controlled thereby will be evident by reference to Figures 2 and 3.

As there indicated, the screw 25 for effecting the horizontal or cross movement of the slide on rail 16 has a portion 40 extending through the transmission boxes 23 and 35. Splined on this extending portion 40 is a double face clutch 41 selectively engageable with either gear 42 or gear 43. As shown, gear 42 is driven by pinion 44 on shaft 45 forming a part of the normal drive transmission of the machine. Gear 43, however, forms no part of the normal machine transmission, but it is added for purposes of the present invention and is driven by pinion 46 operated by the high pressure rotary pump 47.

A translatable clutch shifting plunger 48 has a shifter arm 49 engaging the clutch 41 for moving it selectively into driving relation with either the clutch face of gear 42 or of gear 43 to determine the nature of the power drive to screw 25.

This shifter may be operated manually by the shift lever 50. It is, however, additionally provided with a piston portion fitting into the hydraulic cylinder or chamber 51 so that introduction of fluid pressure into the chamber through conduit 119 may serve automatically to move the shifter to disconnect the mechanical power drive through pinion 44 and gear 42 to screw 25 and positively to couple clutch 41 with gear 43 for hydraulic actuation of the screw.

The hydraulic actuating medium for operation of the several elements of the machine is contained in a tank or sump of hydraulic unit 32 from which it is delivered by a suitable pump 53 into the high pressure conduit 33, the pump 53 being driven either from the main motor 21 or by a supplemental electric motor 21a. For determination of the volume or rate of flow of the pressure medium through conduit 33 there is provided the adjustable rate valve 54', while disposed intermediate pump 53 and rate valve 54' is a branch conduit 55 extending through the adjustable relief valve 56 to discharge into the sump or tank 32. The setting of the valve 56 determines the available pressure in the line 33 and provides for discharge therefrom of any excess output of the pump 53 over the utilizable quantity transmitted through rate valve 54.

The tracer housing section 36, as illustrated in Figure 2, is provided with the inlet ports or grooves 57, 58 and 59 to which conduit 33 is directly coupled. Slidably mounted within the housing is the tracer valve member 60 urged toward the left by spring 61 and provided at its left hand end with the cone seat 62 receiving ball 63 whose opposite face is fitted within the cone seat 64 of head 65 on the inner or right hand end of the tracer finger 37. This finger has intermediately secured thereon a ball or fulcrum 66 seated in the tracer shell or extension 67 which has at its outer end sufficient clearance to permit of rocking movement of the tracer 37 about the ball as a fulcrum while the shape of the seat is such as to permit longitudinal movement of the tracer finger upon terminal pressure against the tracer tip 68. The specific structural details of one form of tracer finger for control of axial movement of a tracer valve in accordance with tilting or axial deflections of the tracer finger are illustrated and described, for example, in Roehm and Campbell Patent 2,089,099, or Campbell Patent 2,039,294, it being understood the particular type of tracer utilized, however, may be varied in accordance with present known and accepted practices. As is customary in tracer mechanisms of this type, the valve 60 has a spool portion 69 preferably slightly underlapped as respects the pressure groove 57 when the spool is in an intermediate position. This permits of potential flow from groove 57 to the chambers formed by the cannelures or grooves 70 and 71 of the valve so that pressure is maintained in both of these grooves, but the relative pressures may be varied by any slight axial movement of the valve to create a pressure differential in the output conduits 72 and 73. The valve 60 is provided with the additional spool portions 74 and 75 so related to spool 69 and to the outlet or reservoir connection portings 76 and 77 as inversely simultaneously to vary the resistance to discharge through one or the other of ports as respects the variation to resistance in flow into the associate valve groove and thus build up the pressure and potential flow in either line 72 or 73 while decreasing the resistance to discharge from the other of said lines. The discharge control conduits 76 and 77 are connected to the low pressure or reservoir return conduit 34 so that movement of the valve 60 controls flow into and through the valve housing to one of the conduits 72 or 73 and at the same time the flow from the other thereof back to reservoir.

*Tracer control of motors 47 and 100*

In the embodiment of the invention illustrated the tracer mechanism and circuits are interdependent and jointly react upon and control both the motor 47 for control of movement of a first slide such as the traversing saddle 18 and also motor 100 controlling the vertical movement of the ram head 19. It is contemplated, however, in the utilization of the present invention that at any particular time and in accordance with selective adjustment of certain of the elements that one of these motors shall be bidirectionally controlled or in other words automatically reversible to effect a back and forth or toward and from movement of the controlled slide while the other slide shall be unidirectional in operation and the control exerted thereon will be with respect only to its rate of movement in the selected direction or to a discontinuance of its movement in such direction. To facilitate an understanding of the basic principles of the invention, the several control valve mechanisms, clutch shifters and the like, have therefore been illustrated in the drawings as positioned so that the tracer valve structure just described will automatically control both the rate and direction of actuation of motor 47 and thus of movement of the saddle or slide 18 while controlling rate only of motor 100 and ram 19, this latter unidirectional movement being ordinarily referred to as a traversing movement.

Disposed in the circuit is a selector valve 78 contained within a sleeve or bushing 79. A suitable shift lever 80 is coupled with the valve to position the same in a manner to condition the circuit for tracer directional control of either motor 47 or 100. In Figure 2 this valve is shown as positioned to condition the circuit for directional control of motor 47 or in the left hand position. As so located, groove 81 couples conduit 72 with conduit 82 while groove 83 couples conduit 73 with conduit 84. These conduits, in turn, extend to the sleeve or bushing 85 of the main control valve 86 for motor 47. This valve is illustrated in a position of intermediate adjustment to the left, which adjustment is effected by movement of the control lever 87 in a clockwise direction. It will be noted that there have been indicated five potential positionings of the control lever 87 for effecting different circuit connections by way of the valve 86.

These are respectively the position 88 for rapid traverse movement to the left, 89 for feeding movement to the left, and 90 for a disconnection of all hydraulic actuating medium as respects the motor 47 or a stop position. Additionally, there is the position 91 in which the lever 87 and valve are shown positioned for effecting feed to the right and position 92 for effecting a rapid right hand movement of the saddle or slide 18. As shown, groove 93 of valve 86 is aligned with conduit 82 and through interdrilled port as indicated at 94 communicates with groove 95, and thus hydraulically connects the conduit 82 with conduit 96. At the same time, branch conduit 84a from conduit 84 is coupled by way of valve groove 97, interdrilling 98 and groove 99 to conduit 100a. Conduits 96 and 100a terminate at suitable portings in the valve sleeve or bushing 101 for cooperation with selector valve 102 which is slidable within the sleeve or bushing 101. In its left hand position, this valve selects tracer control for the motor 47 and in its right hand position disconnects the tracer control and connects the motor for servo-control. These positions of the valve are manually determinable as by the valve shifting lever 103.

When the valve is in its left hand position as shown in Figure 2, groove 104 couples 72 by way of 82 and 96 to motor conduit 105, while at the same time the valve groove 106 connects conduit 73 by way of 84, 84a, and 100 to motor conduit 107. In this manner a closed circuit is provided extending from tracer valve groove 70 to one side of the hydraulic motor 47 and back from the opposite side of the hydraulic motor to tracer valve groove 71. With the tracer finger in its undeflected position, permitting movement of the tracer valve 60 to the left, the hydraulic medium under pressure will be forced by pump 53 through conduit 33 by way of the tracer and intervening valves as just described into conduit 107 effecting rotation of hydraulic motor 47, and thus through gear 43 and clutch 41 the feed screw 25 in a direction to move the slide or saddle to the right. Deflection of the tracer finger 37 by engagement with the pattern 38 will reduce the rate of flow of pressure fluid, and thus actuation of the motor until the valve spool 69 is shifted to the hydraulic neutral or substantially central position with respect to groove 57 when the balanced pressure reactions in conduits 105 and 107 will stop operation of motor 47. Additional deflection of the tracer will effect a further movement of valve spool 70 toward the right so that the pressure medium will now flow into 72 and thus, through the connections described, into conduit 105, reversing the direction of operation of motor 47 and thus of screw 25 and saddle 18.

It will be noted that when the tracer is undeflected, conduit 72 is coupled with reservoir, this being the condition existing when the tracer finger is out of or substantially out of contact with the pattern. As the tracer finger contacts the pattern it is very desirable that further operation of the machine be entirely under tracer control and either direct mechanical operation of the slide as through drive 45 or servo or hand hydraulic actuation thereof prevented. For accomplishment of this result there is coupled into conduit 72 a branch control conduit 108 having the branches 108a, 108b, 108c, 108d, 108e, and 108f. Pressure in conduit 108a reacts in cylinder 109 to move plunger 110 into the blocking position shown in Figure 2, while pressure in conduit 108b correspondingly reacts in cylinder 111 against blocking the plunger 112.

When plungers 110 and 112 are in the inward position shown in Figure 2 they limit the axial or longitudinal shifting of valve 86 to its three central positions, namely stop, feed left, or feed right, and prevent the extreme movement of the valve necessary for either right or left hydraulic rapid traverse of the saddle. The spring loaded detent 113 reacts on segment 114 for retaining shift lever 87 in its several adjusted positions. In a corresponding manner, pressure in the branch conduits 108c and 108d moves inward by the plungers 115 and 116, limiting axial movement in either direction of the control valve 117 of a character generally similar in function to the valve 86 as will be hereinafter described.

As respects the particular operation of the machine primarily illustrated in Figure 2, it will be noted that the branch conduit 108e is coupled through groove or cannelure 118 of valve 102 with conduit 119. Therefore, when pressure exists in conduit 72 due to deflection of the tracer valve this pressure will be transmitted through conduit 119 to the pressure cylinder 51, thus positively disconnecting mechanical drive through clutch 41 and moving the clutch into position for hydraulic drive of the screw 25. On this movement, the segment 120 will snap by detent 121 to lock the shift lever 50 and thus the clutch in this coupled relationship.

At the same time pressure will also be introduced into conduit 108g, reacting in cylinder 122 against the end of valve 102, insuring that this valve takes up the position illustrated in Figure 2, blanking off the direct pressure conduit 123 and the servo-control conduits 124 and 125 as respects the conduits 105, 107, and 119.

From the foregoing it will be apparent that the tracer valve mechanism when the tracer is undeflected and valve 78 is in the tracer horizontal position will supply actuating medium to motor 47, causing a movement of the tool toward the work in the relationship of the parts shown in Figure 1, if the valving is also all positioned as indicated in Figure 2. At this time, however, there is no appreciable or effective pressure in the conduit 72 so that the valve elements, such as 86, 102, and shifter 41, are free for manual adjustment and control. For example, if lever 103 under these conditions is moved in a counter-clockwise direction, shifting valve 102 to the right, conduits 96 and 100 will be disconnected from conduits 105 and 107 which will then be respectively connected with conduits 125 and 124 extending to the servo-control valve bushing 126. Centrally coupled to this bushing is the direct pressure line 127. Contained within the bushing is the slidable servo-control valve 128 having cannelures 129 and 130 respectively, coupling pressure to conduit 124 on right hand movement of the valve and to 125 on left hand movement of the valve and alternatively coupling the opposite conduit to the general low pressure or reservoir conduit 131. A suitable valve shifting means, such as the bracket 132, connects this valve with shifter groove 133 of shaft 134 provided with the hand wheel 135. This shaft is journaled on the control box 35 as in anti-friction bearings 136 for limited axial movement and has a threaded portion 137 fitting into nut 138 having the external gear portion 139 meshing with gear 140 on shaft 141. Shaft 141 is synchronously driven by screw 25 through bevel gears 142, and 143, the latter being received on screw 25 so that the gear 140 rotates in timed relation to the rotation of the screw. Shaft 141 is further provided with the indicating dial 144 for indicating the amount of adjustment of the screw and thus of the translatable saddle.

The operation of this mechanism will be readily apparent in that it will be seen that rotation of the hand wheel 135 in one direction or the other will cause a forward or back axial movement of shaft 134 and impart corresponding sliding movement to valve 128, admitting actuating pressure in one direction or the other to the hydraulic motor 47 for effecting rotation of screw 25. At the same time the gearing 142, 143, and 140 will effect a feed back rotation of nut 138 tending constantly to restore valve 128 to its neutral position. In this manner a most accurate servo-control adjustment may be imparted to the translatable saddle by the slight effort required to rotate hand wheel 135. This movement, of course, may be continued until such time as the tracer finger is deflected to cause introduction of actuating pressure by way of conduit 72 into cylinder 122 when valve 102 will be moved to the left, disconnecting conduits 124 and 125 from conduits 105—107 to the hydraulic motor 47, gears 142 and 143, however, continuing to rotate so that the dial 144 still indicates the adjustment of the parts.

To prevent jamming of the servo-mechanism under these conditions a yoke or clevis member 145 is splined or secured on the shaft 134 for rotation therewith. This member cooperates with the centralizing springs 146 and 146' carried by the nut 138 so that the shaft rotates with the nut but without effecting controlling displacement of the shifter 132 and servo 128 while permitting all necessary relative rotation of the shaft and nut for servo-control purposes when valve 102 is in the right hand position and the circuit so conditioned.

Branching from conduit 33 intermediate rate valve 54' and the connection of conduit 57 to the tracer bushing or housing 36 is a pressure conduit 147 ported into the housing at 58. The valve 60 has a cannelure as at 149 for coupling 58 through the tracer housing to the traverse conduit 150. The relative spacings of 58 and 150 and length of groove or cannelure 149 is such that when valve 60 is in a position of maximum deflection to the left, as shown in Figure 2, the spool 151 blocks off flow into conduit 150 while when the tracer is in a position of substantially maximum angular deflection, the resultant shifting of valve 60 to the right causes spool 75 to block inlet porting 58. In intermediate positions of valve 60, however, the length of the cannelure is such that a variable throttle is provided by the bounding spools 75 and 151 as respects the flow from 147 to 150, maximum flow taking place when the spool 69 is in its hydraulically neutral position such that the established pressure conditions lock motor 47 against rotative movement.

It will thus be evident that axial shifting of spool 60 as determined by deflection of the tracer finger 37 inversely varies the potential flow through the branch conduits 57 and 147, slowing down the traverse flow as the toward or from movement increases and speeding up the traverse as the rate of toward or from movement is decreased. Inasmuch as there is a constant rate or volume of flow through the rate valve 54' of the actuating fluid, which is thus distributed between conduits 57 and 147, the rate of relative movement of work and cutter or the cut speed will be substantially constant irrespective of the particular direction of effected relative movement.

Figure 3:
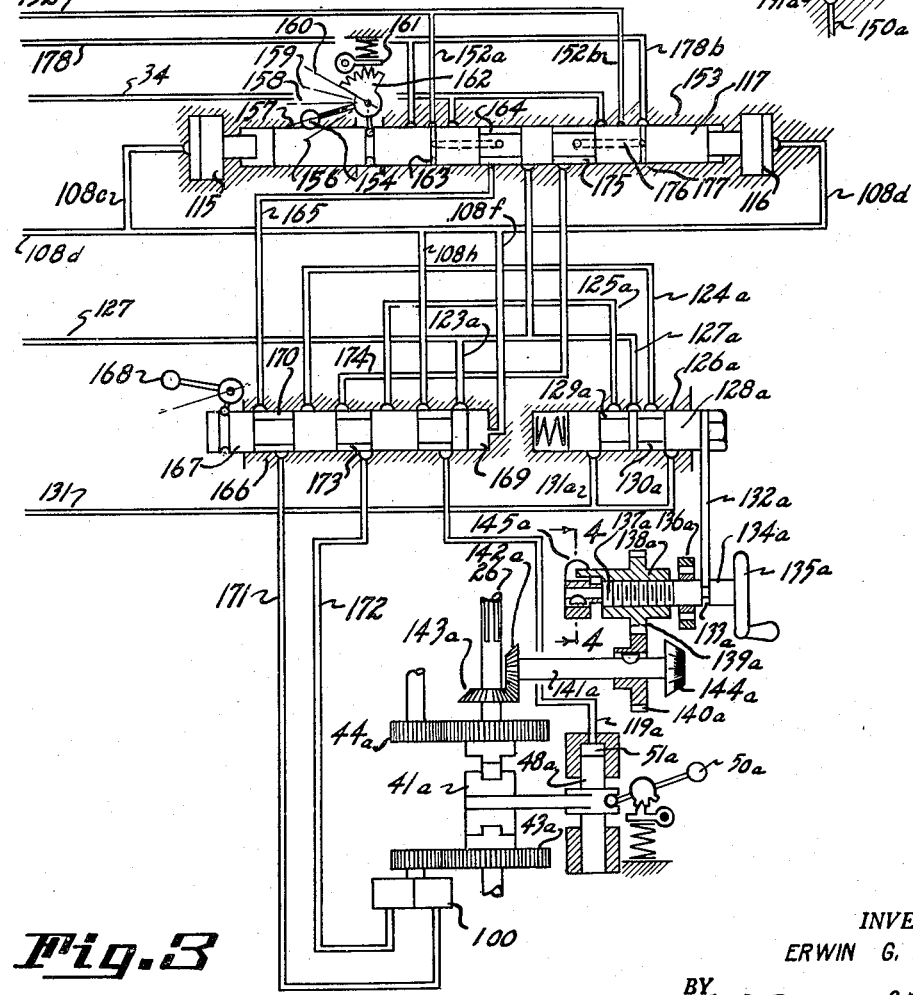

As has been described, the tracing selector valve 78 is shown in Figure 2 in its left hand position coupling the tracer directional control circuit with motor 47. Conduit 150 discharges through porting in the valve bushing 79 to the groove or cannelure 151' at the right hand end of valve 78, and in the position of the valve illustrated this couples 150 with conduit 152 having the branches 152a and 152b as shown in Figure 3 ported at suitable longitudinally spaced positions into the bushing 153 for valve 117. The general structure and circuit coupling of valve 117 is similar to that previously described in connection with valve 86. It is controlled by the manually operable shift lever 154 having the five positions 156 for rapid downward movement, 157 for downward feed, 158 for a stop position, 159 for upward feeding and 160 for upward rapid traverse.

A detent 161 cooperating with segment 162 serves to lock the lever and thus the valve in any manually selected position. As has been previously mentioned, the pressure operated centralizing plungers 115 and 116 are hydraulically operated by pressure in the branch conduits 108c and 108d hydraulically to kick the valve out of rapid traverse or prevent its manual movement into rapid traverse position when deflection of the tracer effects pressure control conditions in the tracer conduit 72. As this valve is intended for selection purposes in connection with the motor 100 operating the shaft 26 for vertical movements of head or ram 19, the lever has been indicated as occupying a generally horizontal position from which it may be moved upwardly for upward movements and downwardly for downward movements to directionally determine movements of the head. As shown, it is in the feed down position which places cannelure or groove 163 in alignment with the bushing porting for conduit 152a from whence the pressure fluid will flow from valve passage 163 to the distributing cannelure or groove 164 and thence through the bushing porting of conduit 165 to the bushing 166 of selector valve 167. This valve corresponds in structure and function to the valve 102 shown at the lower portion of Figure 2 in that it is axially movable manually by selecting lever 168 to condition the circuit for either manual servo-control, or tracing control of motor 100. The bushing 166 provides the pressure chamber or cylinder 169 receiving the end of the valve which thus acts as a piston. This cylinder 169 is connected by conduit 108h with the general pressure line 72 so that on deflection of the tracer the fluid under pressure will be introduced into the chamber moving the valve automatically to the left so that the motor circuit is conditioned for tracer control. In this position, as illustrated, conduit 165 is coupled through the cannelure groove 170 of the valve to motor conduit 171 extending to one side of the motor 100. The opposite side of the motor is coupled through conduit 172, groove 173 in valve 167, conduit 174, groove 175, channel 176 and groove 177 of valve 117 to branch 178b of conduit 178. This conduit 178 extends into the bushing 79 of valve 78 and in the position of the parts indicated is coupled by cannelure or groove 179 to the reservoir discharge conduit 180.

It will thus be seen that whatever proportion of fluid passing through rate valve 54' is transmitted by the general tracer valve structure into conduit 150 will effect rotation of the motor 100 at a rate dependent on the proportion of pressure fluid so transmitted. Under general operating conditions it has been found, particularly with employment of small displacement rotary motors, such as here indicated, which greatly reduce the compressibility of oil variations existing in connection with actuating cylinders of large volumetric capacity, that the circuit described is sufficiently accurate in its responsive control for the performance of the desired shaping or contouring operations.

*Additional traverse control*

For maximum efficiency under any and all operating conditions, there has been provided an additional control for the rate of operation of the traversing motor 100, or alternatively of the motor 47 when that motor, as hereinafter described, is utilized for traverse control. This mechanism in the form indicated in Figure 2 includes a valve block unit or assembly 181 having a pair of valve chambers 182 and 183 interconnected as by the port or passage 184. The conduit 180 is ported through the valve block to discharge into the valve chamber 182 while a discharge or reservoir conduit 185 is ported through the valve block 181 in communication with chamber 183. Slidably mounted within the chamber 182 is a control valve 186 having a taper portion 187 effective variably to throttle the flow through 180 into the chamber and having the groove 188 for coupling this throttled flow with conduit 184. At a lower portion the valve is provided with a blocking spool 189 and a projecting stem providing a piston portion 190 movable in the chamber 191 which is coupled by conduit 150a with the traverse flow conduit 150 previously described. A drain conduit 192 intervenes spool 189 and chamber 191 to prevent entrapment or building up of fluid pressure which will react against the underside of spool 189. A pressure control conduit 108k extends from the tracer line or conduit 72 through porting in the valve block 181 to the upper end of the valve cylinder or chamber 182 so that introduced pressure will react against the upper end of valve 186. Disposed within the valve chamber 183 is a valve 192' similar to the valve 186 having an upper piston portion 193, the intermediate throttle portion 194 effective as respects the discharge conduit 185 and the groove 196 to provide communication between the transverse port or conduit 184 in the valve block and said discharge conduit 185. This valve similarly has the intermediate or blocking spool portion 195 and terminal stem 196' extending into the reduced diameter pressure chamber 197 coupled by conduit 150b with the traverse pressure transmitting conduit 150.

The resultant reactions on the valves 186 and 192' will be evident from the drawings, and it will be noted that these are in the nature of balancing valves in which in each instance the piston area subject to the pressure existing in line 72 on deflection of the tracer is greater than the area subject to pressure in the traverse flow division conduit 150, while the nature of the grooves 188 and 196 are such as to establish a balanced condition so that no movement of the valves will be effected by the varying values of pressure in the traverse return conduit 180. Consequently, as pressure in 72 builds up, due either to valve opening or work or other resistances to movement of the controlled slide, it will move valve 186 into flow throttling or shut-off position. Correspondingly, the pressure increase in 73 will correspondingly react against valve 192', and it is only when the actuating pressure for the traverse motor is appreciably in excess of the pressures in lines 72 and 73 that both valves 186 and 192 will be moved into position relieving the back pressure in line 180 to permit operation of the traverse motor.

Springs 286 urge the valve 186 and the valve 192' upward, supplementing the pressure reaction against the lower piston portion of the valves while resistances 287 in the pressure conduit to the upper piston of each valve dampens any possible oscillation effects in the system.

It will, of course, be evident that the varying positionings of the tracer controlled valve 60 tend to divide or distribute the rate valve determined volume of pressure fluid between the toward and from and traversing motors in a manner that as the tracer valve is deflected either positive or negative it tends to cut down the flow to the traverse motor. In other words, if the tracer should meet an abrupt rise the overdeflection of the tracer will slow down the traverse so that the major percentage of the oil goes to the tracer controlled slide.

Alternatively, as the tracer moves off of an eminence and towards a cavity in the pattern, or is free from engagement with the pattern, the under or negative deflection of the tracer again shuts down traverse oil. This, however, has its limitations in a general purpose machine as the tracer control of toward and from movement is responsive to extremely slight movements whereas the traverse communication underlap must provide sufficiently large ports to pass without restriction the quantity of oil necessary for maximum feed rate, and is not therefore equally effective when slower feed rates are employed in the absence of utilization of a different valve or more restricted porting. The balancing valve mechanism just described, therefore, serves to supplement or supplant this control of the input of traverse oil by its immediate and sensitive response to pressure conditions in the system as distinguished from volumetric reactions and by its automatic control of the traverse return oil this mechanism positively determines the rate of operation of the motor then functioning as a traverse motor, by adding the desired resistance to the back pressure line.

In the particular position of the several elements illustrated in Figure 1 it will be noted that the valve 60 with the tracer in its maximum negative or undeflected position, tends to direct practically all of the available pressure fluid through conduit 73 for operation of motor 47 and at the same time creates a relatively high pressure in chamber 183 reacting to force valve 192 downward as shown, closing off discharge through conduit 185 against any pressure supplied through conduit 150b to chamber 197. At the same time the back pressure in conduit 72 will normally be sufficient to maintain valve 186 in its depressed or return throttling position so that there will be no traverse or vertical movement effected of the head 19 and the saddle 18 and cutter 20 will be moved in a direction toward the interior face of the work W to be formed by the tool 20.

On the other hand, as the tracer finger 37 is deflected by contact with the template 38 the spool 70 will be shifted to a centralized position, reducing the pressure reactions in 72 and 73 while diverting more pressure through groove 149 into 150, thus building up the pressure in conduits 150a and 150b raising the valves 186 and 193 to relieve the back pressure against the traverse motor which is controlling the vertical movement of head 19 to cause same to feed the cutter downwardly over the face of the work. However, should subsequent deflection of the tracer or resistance to the movement of the cutter into the work result in an increase in the pressure in conduit 73 reacting to operate the motor to feed the cutter into the work, this pressure reacting in chamber 183 will depress valve 193 to slow down the traverse rate until the tool has cut itself sufficiently free to relieve the abnormal pressure resistance. In this manner the traverse or feed rate is automatically controlled even though the movement of the tracer valve 60 is practically negligible and insufficient, in any event, of itself to effect the desired throttling of the input to the traverse movement. It will thus be seen that a greater accuracy and sensitivity of control responsive not only to physical movements of the tracer valve mechanism but also to relative pressure conditions has been provided.

Safety stop mechanism

Figure 5:
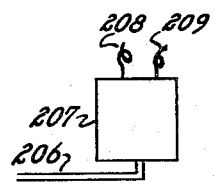
Figure 5 is a diagrammatic view illustrating the coupling of the safety switch to the tracer mechanism.

As an additional safety feature to prevent damage to work, cutter, or machine in the event of threatened undue overdeflection of the tracer finger as by meeting a straight wall or other obstruction wherein relative rates or direction of operation of the slides will not properly free the same, there has been provided an additional safety mechanism. This comprises the auxiliary valve chamber 201 formed in the tracer housing 36 and preferably axially aligned with the tracer valve 60. Slidable within this chamber is the valve 202 having the central groove 203 and urged in a left hand direction as illustrated by the relatively heavy spring 204. The terminal portion of the valve 202 forms an abutment for the lighter tracer valve spring 61 extending axially within which is the pin or abutment 205 normally terminally spaced from the end of valve member 60. Overdeflection of the tracer finger 37, however, will cause sufficient axial movement of the valve 60 so that it will engage and mechanically shift pin 205 and thus valve 202 to the right. This movement to the right will align groove 203 with the inlet port 59 from the main pressure conduit 33, serving in this position to couple 33 with the conduit 206 extending to the safety pressure switch unit 207 of conventional type shown in Figure 5 into which extend the electrical leads 208 and 209 of the circuit for the actuating motors, such as 21 and 54, for the machine. Pressure actuation of the switch will interrupt the motor circuits so that the entire actuating power will be shut off and the machine stopped on such mechanical overdeflection of the tracer finger.

In Figure 6 there has been shown a slight modification of the back pressure balancing valve control mechanism previously described in that use is made of but a single valve 210 slidable in the bushing 211. This valve, like the valves 186 and 192 previously described, has the enlarged piston portion 212 at one end, the intermediate tapered or throttling shoulder 213, blocking spool 214 and the reduced terminal piston portion 215 extending into the chamber 216. In the employment of this form the traverse actuating pressure is coupled to the chamber 216 by a conduit 150c corresponding to conduit 150a or 150b while the conduits 108h and 73 are coupled with the valve housing 217 containing the check valves 218. Extending from said casing is the outlet conduit 219 coupled to the chamber 220 which receives piston 212. This arrangement of parts is such that a preponderance of pressure in either 73 or 108h will react on the check valves 218 to shut off the low pressure line while opening to permit flow from the higher pressure line into conduit 219 where it will react on the piston 212 moving the same downward into position to throttle or shut off the traverse pressure discharge conduit 180 by way of the groove 221 to reservoir or return conduit 185. To prevent creation of a pressure lock against the valve 210 there is preferably provided in line 219 a pressure bleeder 222 coupled with the return conduit 185. It will be understood that the pressure drop through the bleeder is very gradual and not sufficient to interfere with the necessary positive reaction of pressure in conduit 219 against valve 210.

A further modification of the invention is illustrated in Figure 7 in which the tracer valve throttling of flow from 147 into 150 is eliminated and these two conduits are directly connected. In this instance traverse control is made dependent entirely upon the operation of the back pressure control valve or control valves which may be either of the single valve type shown in Figures 6 and 8 or the double valve type shown in Figures 2 and 7. In this form of the invention the conduit 150 is coupled as at 150a and 150b to the valve block 181 for reaction against the lower end of the valves 186 and 193 while the conduits 108h and 73 are coupled to react against the upper ends of these valves. In this form the back pressure line 180 is coupled to the valve block for control by the respective valves 186 and 193 as previously described, the remainder of the circuit being as illustrated in Figure 2.

Figure 8:
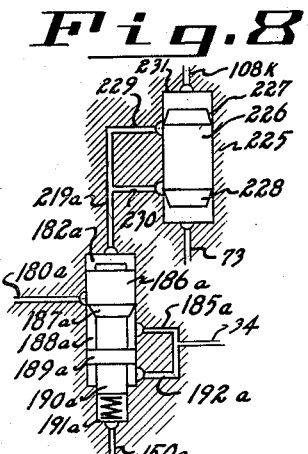

Figure 8 shows a back pressure throttling control similar in general structure and operation to that described in connection with Figure 6, making use of a throttling valve 186a corresponding in structure to the valve 186 of Figure 2. This valve is slidable in the valve block 181a and has the enlarged piston portion at its upper end, the tapered or bevelled throttling shoulder 187a controlling the flow from channel 180a into the chamber formed by the piston groove 188a, while extending from the block is the outlet conduit 185a. The blocking spool 189a below which is the reservoir drain connection 192a prevents flow of the pressure fluid into the reduced diameter cylinder at the lower portion of the valve bushing or block in which moves the piston 190a. As in the forms previously described, traverse pressure in the conduit 150 reacts in the cylinder chamber 191a against piston 190a, tending to raise the valve variable to open the throttle for the traverse return flow as effected by the portion 187a of the valve.

Coupled with the upper chamber 182a is a conduit 219a having the branches 229 and 230 ported into the valve block 225, having the chamber 231 in which is reciprocable the valve 226 having the tapered end portions 227 and 228. Conduit 108h is coupled to one end of the chamber 231 while conduit 73 is coupled to the opposite end.

By reference to Figure 8, it will be noted that the length of the central or non-tapered portion of the valve member 226 is preferably slightly less than the outer limits of the portings of 229 and 230 into chamber 231 so that a slight underlap is provided. As a result, when the member 225 is in hydraulically neutral or central position there will be a pressure reaction from 73 into 230 and a similar pressure reaction from 108h into 229, maintaining pressure in chamber 182a. This condition corresponds to the hydraulically neutral position of the spool 69 on the tracer valve.

When the tracer valve is displaced negatively from its hydraulically neutral position, rise of pressure in 73 will react on valve 226, closing off pressure flow from 108k into 229 so that pressure may build up through 230—219a in 182a, urging the valve 186a toward extreme traverse return throttling position.

Correspondingly, an increase of pressure in conduit 72 caused by opposite movement of the tracer valve will increase pressure in 108k, moving valve 226 down so that this pressure, reacting through 229—219a, will likewise correspondingly move valve 186a.

On the other hand, when the tracer valve spool 69 is in its intermediate or hydraulic neutral position, pressures in 108k and 73 will be equalized, centralizing 226 when the pressure reaction through 150a on the piston 190a will predominate and raise valve 186a, reducing its throttling effect to relieve the back pressure in the traverse return conduit 180a, permitting the desired speeding up of the traverse motor. It will thus be seen that in this form, as in the forms previously described, there are interdependent controls for the rates of operation of the toward and from and the traverse motors of such character that a demand for an increase toward or from rate of movement will hydraulically react on the control of the traverse exhaust, thus slowing down the traverse rate. At the same time decrease in demand of pressure fluid for toward or from movement will hydraulically react to effect a speeding up of the traverse motor.

As has been described in detail, when the mechanism aforesaid has been mounted upon a boring, milling, or other machine tool having a pair of translatable slides it serves to take the place of or alternatively to supplement the usual mechanical driving means for said slides and may be varyingly conditioned according to the particular nature of relative movements desired. In the arrangement of the parts indicated in Figures 2 and 3 the tracer is in its undeflected or maximum negative position and the tracer valve itself correspondingly located.

With the tracer circuit selecting valve 78 in its left hand position, the tracer then controls both rate and direction of the hydraulic motor 47 for what is usually termed the tracing movement as distinguished from unidirectional traverse movement effectable by the motor 100. However, when the parts are so positioned, if the hydraulic actuating medium is shut off, either by placing the rate and direction valve in its intermediate or stop position blocking flow in the tracer controlled hydraulic conduits 82 and 84 as respects the conduits to motor 47, or by closing of the rate valve 54' or stoppage of hydraulic pump driving motor 21a, use may be made of the mechanical driving mechanism in the normal manner, this mechanical driving action being determined by positioning of the mechanical or hydraulic selector lever 50. On the other hand, if the hydraulic power is turned on, the machine may still be operated either mechanically or under servo-control, mechanically if the valve 102 is in an intermediate or tracer position and the shifter clutch 41 engaged so long as the tracer finger 37 is undeflected, or under servo-control if the valve 102 is in its right hand position and irrespective of the position of the tracing cycle directional control valve 86. However, in this setting of the valves, when the tracer is deflected, introducing pressure through 72—108, valve 102 is power shifted to the left by the pressure in 108g which, in turn, coupling 108e with 119 moves clutch 41 to disconnect the mechanical drive. At the same time this movement blocks power line 123 as respects 119, rendering the servo ineffective.

It is further to be noted that when the tracer finger is out of engagement with the pattern, lever 87 may be placed in either an extreme left hand or right hand position directly coupling pressure conduit 33a with 96—105 or 100—107 to effect rapid rotation of the hydraulic motor 47 in one direction or the other until tracer deflection creates pressure in 72—108 automatically to shift valve 86 from the rapid to feed position. The feeding bias of the tracer, that is, the movement effected during its negative positioning, will be either toward the right or toward the left in accordance with the one position or the other of valve 86 which effects a reversal or interchange coupling between the conduits 82—84 from the respective tracer valve grooves 70—71, and the conduits 96—100 to motor 47.

It will be understood that the controls for the circuit extending to the motor 100 are, as previously described, substantially duplicates of those for the motor 47 and effect corresponding resultant connections. In the initial phase I have described motor 100 as being utilized as a traversing motor, while motor 47 was reversibly employed for the back and forth movement. When it is desired to interchange the functions of these two motors this is effected by a translation of the valve 78 from the left hand position shown to a right hand position. This places the motor 100 controlling vertical movement under reversible control of the tracer while the motor 47 becomes the traversing motor effective in either a right or left hand feeding direction dependent upon the position of lever 87 and valve 86. When the valve 78 is shifted to its right hand position it will be be evident that the tracer conduit 72 is then coupled with conduit 178 and tracer conduit 73 with conduit 152 so that in the undeflected position of the tracer the hydraulic actuating medium will pass through conduit 152 and, in the position of valve 153 shown in Figure 3, through groove 163 and conduits 165 and 171 to operate motor 100 for effecting a downward movement of the tool carrying ram or head which will be stopped or reversed according to deflection of the tracer arm 37. In other words, this result is attained merely by moving the tracing motor selector valve without shifting of valve 117. At the same time the motor 100 return conduit 172 will be coupled through 174, 178b and 178 with conduit 72 leading into the tracer valve groove 70.

This positioning of the motor selector valve 78 concomitantly couples conduit 150 through 84a, 92, 84a, 106, 107 to motor 47 which becomes the traverse motor while its return is through 105, 96, 94, 82b, 180 to the back pressure control valves.

Correspondingly, reversal of the valve 86 from a feed right to a feed left position will interchange or reverse the couplings of the two motor conduits 105 and 107 as respects the pressure in return lines 82 and 84 for effecting traverse in the opposite direction.

Likewise the shifting of valve 117 from a right hand position or "feed down" to a left hand or "feed up" position will reverse the bias or primary direction of rotation of the tracer controlled motor 100 when the tracer valve and finger are in their negative position.

As the various controls for determination of the manner and direction of actuation of the spline shaft 26 are substantially the same as the controls for the screw 25, they have been identified by corresponding reference characters provided with exponents. These parts include the conduits 124a and 125a interconnecting the servo-tracer selecting valve 167 and the servo-control valve bushing 126a. Contained within this bushing is the slidable servo-control valve 128a having the cannelures 129a and 130a respectively coupling pressure conduit 127a to conduit 124a on left hand movement of the valve and to 125a on right hand movement of the valve and alternatively coupling the opposite conduit to the general low pressure or reservoir conduit 131a. A suitable valve shifting means such as the bracket 132a connects this valve with the shifter groove 133a of shaft 134a provided with the pilot wheel 135a. This shaft is journaled in the control box 35 as in anti-friction bearings 136a for limited axial movement and has a threaded portion 137a fitting into nut 138a having the external gear portion 139a meshing with gear 140a on shaft 141a. Shaft 141a is driven through beveled gears 142a, 143a, the latter being secured on spline shaft 26 so that gear 140a rotates in timed relation to the rotation of the shaft. Shaft 141a is further provided with a dial 144a for indicating the amount of adjustment or rotation of the splined shaft and thus the movement of the vertical slide or ram 19.

Figure 4:
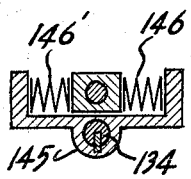
Figure 4 is a fragmentary section on line 4—4 of Figure 3.

As with the form previously described, rotation of hand wheel 135a in one direction or the other will cause a forward or back translation or axial movement of shaft 134 and through the bracket 132a impart a corresponding movement to the valve 128a, admitting actuating pressure in one direction or the other to the hydraulic motor 100 for effecting rotation of splined shaft 26. At the same time, the gearing 143a, 142a, and 140a will effect a feed back rotation of nut 138a tending constantly to restore valve 128a to its neutral position. In this manner most accurate servo-control adjustments may be imparted to the variably movable ram by the slight effort required to rotate hand wheel 135a. This movement, of course, may be continued until such time as the tracer finger is deflected to cause introduction of actuating pressure by way of conduits 72, 108, 108f into cylinder or chamber 169 moving valve 167 to the left. This movement of the valve disconnects pressure conduits 124a and 125a from motor conduits 171 and 172 and places these in communication with the tracer controlled conduits 165 and 174. With this valve positioning the servo is then rendered ineffective and the motor 100 placed under direct tracer control. This, of course, does not interrupt rotation of shaft 141a and dial 144a which continue to move in accordance with rotation of spline shaft 26 and thus to indicate the amount of any additional adjustment imparted to the tool carrying ram. To prevent jamming of the servo-mechanism or the like under this situation of continued rotation of the nut 138a, it is provided with a centralizing spring device of the type shown at 146—146' in Figure 4 cooperating with the yoke or clevice 145a secured on the shaft 134a for rotation therewith. This spring carries the parts around as a unit so that there is no axial displacement of the shaft 134a and consequently the servo-valve is maintained in its neutral position.

It will further be apparent that the mechanical drive 45a is available through gearing 44a to effect operation of the spline shaft at a rate and direction determined by the mechanical drive control levers 24 of the machine when clutched to the spline shaft by upward movement of the double face clutch 41a. However, when hydraulic power is being employed the pressure in 119a from either line 108h or 123a reacts through line 119a in chamber 51a to move the shifter plunger 48a downwardly as viewed in Figure 3 so that the driving connection is to the gearing 43a operated by hydraulic motor 100.

From the foregoing it will be evident that there has been provided by the present invention an improved control mechanism capable of application to and utilization in connection with existing machine tools in that by the employment of an additive control box or control boxes, individual hydraulically actuable motors and coupling control devices, the normal operating instrumentalities for a plurality of slides or movable parts may be placed under hydraulic control. It will further be noted that the construction of the mechanism is such that a single tracer unit may be utilized for determining the effective operation of the several controls in a manner to determine the respective rates of movement imparted to the hydraulic slides so that the tool and work will be relatively traversed and in a path corresponding to the contour or outline of the template or pattern engageable by the tracer. Also, the arrangement of parts is such that the tracer and its associate circuits and control mechanisms provides a multiple safety device, first positively disconnecting the mechanical drive when either tracer or servo-hydraulic power operation is selected, and, additionally, automatically disconnecting all except automatic tracer control for the in and out slide when the tracer is deflected by engagement with the pattern or other object. Additionally, the arrangement is such that selection may be made primarily as to which slide will be unidirectionally operated and which slide will be given reversible or back and forth movement during tracer controlled operation, in which the basic direction of tracer controlled forward movement may be individually selected as respects each of the controlled slides, which selecting mechanism may also be utilized for direct non-tracer or servo-controlled hydraulic movement of the slides in either direction and at either feed or rapid traverse rates.

Additionally, various safety control mechanisms and circuits, basically actuable or energizable by deflection of the tracer contact finger and thus movement of the tracer valve mechanism, have been provided of a character to stop or prevent rapid traverse of either slide during tracer deflection, to slow down the traverse by throttling of the input side of the traverse circuit or alternatively or additionally by throttling of the back pressure or return line of the traverse circuit in accordance with the established pressure conditions and for stopping the power drive either hydraulic, mechanical, or both on pronounced tracer finger deflection. It will, therefore, be further evident that a machine having a pair of slides or elements moving in crossing or angularly related paths and therefore particularly adapted to the formation of profile contour and like surfaces and which embodies improvements of the present invention may have the said movable elements individually mechanically operated or shifted, individually hydraulically controlled by direct application of power for either feed or rapid traverse movements, may be servo-controlled for fine adjustments or feeding operations or may be automatically tracer controlled as to the relative rate and direction of movement of the respective elements. The complete embodiment as illustrated has the capacity for individual selection of the various manner and nature of operations as respects the individual movable element, and, in addition, the automatic disconnection or rendering inoperative of certain of the potential actuators or controls, depending on the cycle and nature of operation. It additionally has various individually or jointly utilizable rate controls for both the tracer or back and forth operating circuit and the traverse circuit which are capable of being rendered interchangeably effective as respects one or the other of the movable elements or slides, together with various safety devices to prevent damage to tool or work during varied operating conditions.

It is, of course, to be understood that while the complete embodiment as illustrated constitutes a highly organized mechanism and combination and arrangement of cooperating, co-functioning parts for attaining the desired result, namely, the proper and accurate shaping of any complicated form of work piece, that according to operating conditions or more specific intended utilizations of the machine, portions or sub-combinations of the novel features as set forth in the appended claims may be individually utilized or employed and that such individual structural features or sub-combinations of parts whether jointly or separately employed constitute distinctive features of the present invention.

What is claimed is:

1. A control mechanism for a machine tool having a pair of elements mounted for movement in angularly related paths, said mechanism including a hydraulic driving motor individual to each of said elements, a source of hydraulic actuating medium, conduit means for supplying hydraulic actuating medium to each of said motors, each of said motors having a hydraulic conduit connected to each side thereof for conducting hydraulic actuating medium to or from the motor, a tracer, a tracer operable valve intervening the supply source and the conduits to one of the motors having a resistance varying portion whereby variable positionings of the valve will determine the pressure and flow conditions in the conduits leading to and from said motor, a pair of throttling valves serially interposed in one of the conduits of the other motor, each of said valves having a piston portion, a first conduit extending from one of the tracer controlled conduits to the piston of one valve, a second conduit extending from the other tracer controlled conduit to the other valve whereby pressure conditions in the conduits will react on the valves for movement of the pistons to determine the position of the respective throttling portions thereof, and means for urging the valves in the opposite direction to resist the reaction of the pressure against said piston portions, said means including auxiliary pistons, and conduits connecting the auxiliary pistons with the supply conduit input of the second motor.

2. A control mechanism for a machine tool having a pair of elements mounted for movement in angularly related paths, said mechanism including a hydraulic driving motor individual to each of said elements, a source of hydraulic actuating medium, conduit means for supplying hydraulic actuating medium to each of said motors, each of said motors having a hydraulic conduit connected to each side thereof for conducting hydraulic actuating medium to or from the motor, a tracer, a tracer operable valve intervening the supply source and the conduits to one of the motors having a resistance varying portion whereby variable positionings of the valve will determine the pressure and flow conditions in the conduits leading to and from said motor, a pair of throttling valves serially interposed in one of the conduits of the other motor, each of said valves having a piston portion, a first conduit extending from one of the tracer controlled conduits to the piston of one valve, a second conduit extending from the other tracer controlled conduit to the other valve whereby pressure conditions in the conduits will react on the valves for movement of the pistons to determine the position of the respective throttling portions thereof, means for urging the valves in the opposite direction to resist the reaction of the pressure against said piston portions, said means including auxiliary pistons, and conduits connecting the auxiliary pistons with the supply conduit input of the second motor, said tracer valve having a throttle portion for varying the input to the second motor in accordance with variable positionings of the tracer valve.

3. A control mechanism for a machine tool having a pair of elements mounted for movement in angularly related paths, said mechanism including a hydraulic driving motor individual to each of said elements, a source of hydraulic actuating medium, conduit means for supplying hydraulic actuating medium to each of said motors, each of said motors having a hydraulic conduit connected to each side thereof for conducting hydraulic actuating medium to or from the motor, a tracer, a tracer operable valve intervening the supply source and the conduits to one of the motors having a resistance varying portion whereby variable positionings of the valve will determine the pressure and flow conditions in the conduits leading to and from said motor, a pair of throttling valves serially interposed in one of the conduits of the other motor, each of said valves having a piston portion, a first conduit extending from one of the tracer controlled conduits to the piston of one valve, a second conduit extending from the other tracer controlled conduit to the other valve whereby pressure conditions in the conduits will react on the valves for movement of the pistons to determine the position of the respective throttling portions thereof, means for urging the valves in the opposite direction to resist the reaction of the pressure against said piston portions, said means including auxiliary pistons, conduits connecting the auxiliary pistons with the supply conduit input of the second motor, said tracer valve having a throttle portion for varying the input to the second motor in accordance with variable positionings of the tracer valve, a selector valve intervening the conduits of the respective motors and the tracer valve, said selector valve having portings effective in one position to couple the pair of motor conduits with the resistance varying portion of the tracer operable valve and the throttling portion of the tracer valve and the throttled return conduit with the other motor and having portings effective in a different position of the selector valve for inversely connecting the tracer controlled and throttled conduits with the respective motors whereby either motor may be selectively placed under directional control of the tracer valve and the other motor simultaneously placed under control of the return line throttling valves.

4. A control mechanism for a machine tool having a pair of elements mounted for movement in angularly related paths, said mechanism including a hydraulic driving motor individual to each of said elements, a source of hydraulic actuating medium, conduit means for supplying hydraulic actuating medium to each of said motors, each of said motors having a hydraulic conduit connected to each side thereof for conducting hydraulic actuating medium to or from the motor, a tracer, a tracer operable valve intervening the supply source and the conduits to one of the motors having a resistance varying portion whereby variable positionings of the valve will determine the pressure and flow conditions in the conduits leading to and from said motor; a pair of throttling valves serially interposed in one of the conduits of the other motor, each of said valves having a piston portion, a first conduit extending from one of the tracer controlled conduits to the piston of one valve, a second conduit extending from the other tracer controlled conduit to the other valve whereby pressure conditions in the conduits will react on the valves for movement of the pistons to determine the position of the respective throttling portions thereof, means for urging the valves in the opposite direction to resist the reaction of the pressure against said piston portions, said means including auxiliary pistons, conduits connecting the auxiliary pistons with the supply conduit input of the second motor, said tracer valve having a throttle portion for varying the input to the second motor in accordance with variable positionings of the tracer valve, a selector valve intervening the conduits of the respective motors and the tracer valve, said selector valve having portings effective in one position to couple the pair of motor conduits with the resistance varying portion of the tracer operable valve and the throttling portion of the tracer valve and the throttled return conduit with the other motor and having portings effective in a different position of the selector valve for inversely connecting the tracer controlled and throttled conduits with the respective motors whereby either motor may be selectively placed under directional control of the tracer valve and the other motor simultaneously placed under control of the return line throttling valves, a combined direction and rapid traverse valve intervening the selector valve and one of the motors, and movable to select feed or rapid traverse rates, hydraulically operable means for preventing movement of said valve into rapid traverse selecting position, and a control conduit coupled with one of the tracer controlled conduits and with said hydraulically operable means for determining the position of said rapid traverse control means in accordance with tracer determined pressure conditions in said conduit.

5. A control mechanism for a machine tool having a pair of elements mounted for movement in angularly related paths, said mechanism including a hydraulic driving motor individual to each of said elements, a source of hydraulic actuating medium, conduit means for supplying hydraulic actuating medium to each of said motors, each of said motors having a hydraulic conduit connected to each side thereof for conducting hydraulic actuating medium to or from the motor, a tracer, a tracer operable valve intervening the supply source and the conduits to one of the motors having a resistance varying portion whereby variable positionings of the valve will determine the pressure and flow conditions in the conduits leading to and from said motor, a pair of throttling valves serially interposed in one of the conduits of the other motor, each of said valves having a piston portion, a first conduit extending from one of the tracer controlled conduits to the piston of one valve, a second conduit extending from the other tracer controlled conduit to the other valve whereby pressure conditions in the conduits will react on the valves for movement of the pistons to determine the position of the respective throttling portions thereof, means for urging the valves in the opposite direction to resist the reaction of the pressure against said piston portions, said means including auxiliary pistons, conduits connecting the auxiliary pistons with the supply conduit input of the second motor, said tracer valve having a throttle portion for varying the input to the second motor in accordance with variable positionings of the tracer valve, a selector valve intervening the conduits of the respective motors and the tracer valve, said selector valve having portings effective in one position to couple the pair of motor conduits with the resistance varying portion of the tracer operable valve and the throttling portion of the tracer valve and the throttled return conduit with the other motor and having portings effective in a different position of the selector valve for inversely connecting the tracer controlled and throttled conduits with the respective motors whereby either motor may be selectively placed under directional control of the tracer valve and the other motor simultaneously placed under control of the return line throttling valves, and combined rate and direction valves individual to the respective hydraulic motors intervening the selector valve and the respective motors, each of said valves having potential rapid traverse effecting positions, hydraulic lock-out means for preventing movement of the respective valves into rapid traverse positions and a control conduit interconnecting one of the tracer valve controlled pressure conduits and said hydraulic lock-out means for actuating said means to prevent rapid traverse actuation of either of the valves on increase of effective pressure in the tracer controlled line due to displacement of the tracer valve by the tracer.

6. A control mechanism for a machine tool having a pair of elements mounted for movement in angularly related paths, said mechanism including a hydraulic driving motor individual to each of said elements, a source of hydraulic actuating medium, conduit means for supplying hydraulic actuating medium to each of said motors, each of said motors having a hydraulic conduit connected to each side thereof for conducting hydraulic actuating medium to or from the motor, a tracer, a tracer operable valve intervening the supply source and the conduits to one of the motors having a resistance varying portion whereby variable positionings of the valve will determine the pressure and flow conditions in the conduits leading to and from said motor, a pair of throttling valves serially interposed in one of the conduits of the other motor, each of said valves having a piston portion, a first conduit extending from one of the tracer controlled conduits to the piston of one valve, a second conduit extending from the other tracer controlled conduit to the other valve whereby pressure conditions in the conduits will react on the valves for movement of the pistons to determine the position of the respective throttling portions thereof, means for urging the valves in the opposite direction to resist the reaction of the pressure against said piston portions, said means including auxiliary pistons, conduits connecting the auxiliary pistons with the supply conduit input of the second motor, said tracer valve having a throttle portion for varying the input to the second motor in accordance with variable positionings of the tracer valve, a selector valve intervening the conduits of the respective motors and the tracer valve, said selector valve having portings effective in one position to couple the pair of motor conduits with the resistance varying portion of the tracer operable valve and the throttling portion of the tracer valve and the throttled return conduit with the other motor and having portings effective in a different position of the selector valve for inversely connecting the tracer controlled and throttled conduits with the respective motors whereby either motor may be selectively placed under directional control of the tracer valve and the other motor simultaneously placed under control of the return line throttling valves, and a servo-circuit including a hydraulic servo-mechanism for independent actuation of one of the hydraulic motors, a manually positionable selector valve for alternatively coupling the servo-circuit or the tracer valve controlled circuit with the hydraulic motor for effecting its actuation, and hydraulic control means including a piston, and a conduit coupled with one of the tracer valve controlled conduits intermediate the tracer and the tracer control selector valve and said piston whereby pressure in the conduit will react on the piston to move or maintain the manually adjustable valve in tracer control position.

7. A control mechanism for a machine tool having a pair of elements mounted for movement in angularly related paths, said mechanism including a hydraulic driving motor individual to each of said elements, a source of hydraulic actuating medium, conduit means for supplying hydraulic actuating medium to each of said motors, each of said motors having a hydraulic conduit connected to each side thereof for conducting hydraulic actuating medium to or from the motor, a tracer, a tracer operable valve intervening the supply source and the conduits to one of the motors having a resistance varying portion whereby variable positionings of the valve will determine the pressure and flow conditions in the conduits leading to and from said motor, a pair of throttling valves serially interposed in one of the conduits of the other motor, each of said valves having a piston portion, a first conduit extending from one of the tracer controlled conduits to the piston of one valve, a second conduit extending from the other tracer controlled conduit to the other valve whereby pressure conditions in the conduits will react on the valves for movement of the pistons to determine the position of the respective throttling portions thereof, means for urging the valves in the opposite direction to resist the reaction of the pressure against said piston portions, said means including auxiliary pistons, and conduits connecting the auxiliary pistons with the supply conduit input of the second motor, said tracer valve having a throttle portion for varying the input to the second motor in accordance with variable positionings of the tracer valve, and a rate throttle intervening the source of hydraulic actuating medium and the tracer valve variably to determine the amount of hydraulic actuating medium jointly available for actuation of the motors.

8. Hydraulic actuating means for a machine tool or the like including a pair of hydraulic motors, an individual rate and direction selecting valve for each of said motors, a source of hydraulic actuating medium for the motors, and a tracer control mechanism including a reciprocable valve, a movable tracer variably positionable to determine the position of the valve, conduit means coupling the source of hydraulic medium with the tracer valve for distribution of flow thereby, distribution conduits extending from the tracer valve to receive actuating hydraulic medium therefrom in accordance with the position of the valve, control conduits coupled with one of said pressure distribution conduits, and limiting means for the rate and direction selecting valves of the respective motors coupled with and operable by introduction of pressure into said tracer controlled hydraulic control circuits.

9. In a hydraulic control system for machine tool operation, the combination including a source of hydraulic actuating medium, of a driven part, a hydraulic motor coupled to drive said part, a first tracer controlled circuit for effecting reversible operation of said motor, a second servo-controlled circuit alternatively employable for operation of said motor, a selector valve positionable alternatively to couple the tracer circuit or the servo-controlled circuit with the motor, an independent rapid traverse circuit, a selector valve in the tracer circuit movable alternatively to couple the rapid traverse or the tracer controlled circuit with the motor by way of the servo-tracer selector valve, a tracer activatable control circuit, and means operable by pressure in said control circuit for moving the tracer-rapid traverse and the servo-tracer valve to establish a tracer controlled circuit intervening the source of hydraulic medium and the hydraulic motor.

10. Operating mechanism for a machine tool including a pair of hydraulic motors and a source of actuating medium for said motors, a supply conduit extending from said source, a rate control valve for determining the flow through the conduit and thus the total volume of actuating medium available for actuation of the motors, actuating pressure conduits extending to the motors, a tracer valve intervening the rate valve and the motor supply conduits for determination of the proportional distribution and pressure of actuating medium as respects said motors, a deflectable tracer operatively associated with said tracer valve for determination of the position thereof, means associated with the tracer valve for determination of the back pressure in one of said motors, an independent valve for determining the back pressure in the other of said motors, said valve having an intermediate back pressure throttling portion and opposed piston portions isolated from said throttling portion, and control conduits coupling the actuating pressure conduits of the respective motors with the piston portions of the valve whereby tracer effected variations in said pressures will react on the throttle valve pistons to determine the throttling effect of said valve.

11. Operating mechanism for a machine tool including a pair of hydraulic motors and a source of actuating medium for said motors, a supply conduit extending from said source, a rate control valve for determining the flow through the conduit and thus the total volume of actuating medium available for actuation of the motors, actuating pressure conduits extending to the motors, a tracer valve intervening the rate valve and the motor supply conduits for determination of the proportional distribution and pressure of actuating medium as respects said motors, a deflectable tracer operatively associated with said tracer valve for determination of the position thereof, means associated with the tracer valve for determination of the back pressure in one of said motors, an independent valve for determining the back pressure in the other of said motors, said valve having an intermediate back pressure throttling portion and opposed piston portions isolated from said throttling portion, control conduits coupling the actuating pressure conduits of the respective motors with the piston portions of the valve whereby tracer effected variations in said pressures will react on the throttle valve pistons to determine the throttling effect of said valve, and additional pressure means reacting on the valve to supplement the effect of pressure in positioning the valve.

12. Operating mechanism for a machine tool including a pair of hydraulic motors and a source of actuating medium for said motors, a supply conduit extending from said source, a rate control valve for determining the flow through the conduit and thus the total volume of actuating medium available for actuation of the motors, actuating pressure conduits extending to the motors, a tracer valve intervening the rate valve and the motor supply conduits for determination of the proportional distribution and pressure of actuating medium as respects said motors, a deflectable tracer operatively associated with said tracer valve for determination of the position thereof, means associated with the tracer valve for determination of the back pressure in one of said motors, an independent valve for determining the back pressure in the other of said motors, said valve having an intermediate back pressure throttling portion and opposed piston portions isolated from said throttling portion, control conduits coupling the actuating pressure conduits of the respective motors with the piston portions of the valve whereby tracer effected variations in said pressures will react on the throttle valve pistons to determine the throttling effect of said valve, and means for dampening the effect on the valve of hydraulic oscillations in the control conduits.

13. Driving means for a machine tool slide including a slide actuating member, a mechanical drive therefor, a hydraulic motor for actuation thereof, a selector clutch for determining the effective coupling alternatively of the mechanical drive, or said motor, a hydraulically actuable clutch shifter for moving the clutch into hydraulic motor coupling position, a source of hydraulic actuating medium, a servo-motor control coupled therewith, a pair of conduits extending from said servo-motor control, a second pair of conduits extending from the hydraulic actuating motor, a selector valve having a first position for interconnection of the respective conduits of the servo-motor control with the hydraulic motor and an additional portion for connecting the source of hydraulic medium direct with the clutch actuator for effective operative connection of the hydraulic motor with the actuable element, an alternatively employable tracer controlled circuit for actuation of the hydraulic motor, conduits coupling the tracer circuit with the selector valve, the valve having an alternative position for disconnecting the servo-conduits and connecting the tracer controlled conduits to the actuating motor, an independent control circuit activated by movement of the tracer valve, connections between said control circuit and the servo-tracer selector valve for moving the valve into tracer circuit connection position on activation of said control circuit by movement of the tracer, and a branch control circuit conduit ported to said selector valve and coupleable thereby with the control circuit for the selector clutch to maintain the clutch in hydraulic motor coupling position when the selector valve is moved to tracer circuit coupling position as respects the motor.

14. A hydraulic actuating system for relatively movable parts of a machine tool including a pair of hydraulically actuable motors, a source of hydraulic actuating medium therefor, a tracer mechanism including a deflectable tracer and a tracer valve actuable thereby, conduit means coupling the source of hydraulic actuating medium with the tracer valve, additional conduit means extending from the tracer valve to the motors, said tracer valve having portions for variably interconnecting the actuating medium conduits with the respective motor input conduits variably to throttle the supply to the motors, a return conduit for one of the motors, a hydraulically operable throttle valve for determining the flow through said return conduit, and conduit connections between the input lines of the respective motors and said valve whereby the pressures in these lines will react on the valve to determine the effective position thereof.

15. Driving mechanism for a machine tool including a driven element, a first power means for actuation thereof, a second hydraulically actuable power means including a hydraulic motor, a source of hydraulic medium for the motor, pressure conduits intervening the source and said motor, a drive selector for determining the coupling of the first power means or the motor with the driven element, a manual control for positioning the drive selector, a hydraulic control for positioning the drive selector, a pair of alternatively available hydraulic power conduits selectively coupleable with the hydraulic motor, selector valve means to couple one or the other of said pairs of hydraulic power circuits with the hydraulic motor, and valve means operable by movement of the selector valve to couple the hydraulic control of the drive selector means with a pressure conduit irrespective of the particular positioning of said valve.

16. Driving mechanism for a machine tool including a driven element, a first power means for actuation thereof, a second hydraulically actuable power means including a hydraulic motor, a source of hydraulic medium for the motor, pressure conduits intervening the source and said motor, a drive selector for determining the coupling of the first power means or the motor with the driven element, a manual control for positioning the drive selector, a hydraulic control for positioning the drive selector, a pair of alternatively available hydraulic power conduits selectively coupleable with the hydraulic motor, selector valve means to couple one or the other of said pairs of hydraulic power circuits with the hydraulic motor, valve means operable by movement of the selector valve to couple the hydraulic control of the drive selector means with a pressure conduit irrespective of the particular positioning of said valve, and a tracer mechanism including a deflectable tracer and a tracer valve actuable by deflections of the tracer, said valve having a portion for establishing a pressure condition in one of said pair of hydraulic power conduits to determine the pressure reaction on the motor selector.

17. A hydraulic actuating system for a machine tool element including a tracer comprising a deflectible tracer element and a tracer valve shiftable by deflections of the element, means for supplying hydraulic pressure actuating medium to said valve, a hydraulic motor, a pair of motor conduits interconnecting the motor and the valve whereby the valve reversibly controls the flow of actuating fluid to and from the motor, a selector valve for determination of tracer control or rapid traverse operation of the motor, means for supplying rapid traverse fluid by way of the selector valve to the motor, an activator for the selector valve, a variably positionable stop for limiting the movement of the selector valve, a hydraulic actuator for the stop, and connections between one of the motor conduits and said activator whereby pressure in said motor conduit will react on the activator to determine the position of said stop.

18. An operating and control mechanism for determining the movement of two relatively shiftable machine tool elements including a tracer mechanism comprising a deflectible tracer and a tracer valve variably positionable by movements of the deflectible tracer, hydraulic motors for actuation of said movable elements, a first tracer reversible hydraulic circuit completable by way of the tracer valve for actuation of one of the motors, a second traverse input circuit completable by way of the tracer for actuation of the other motor, a serially disposed selector valve for determination of the respective couplings of the actuating circuits with the motors, individual serially interposed direction determining means for each of the motor circuits, an alternatively available servo-control mechanism including an actuating circuit and servo-valve for each of the motors, a serially arranged valve in each of the motor circuits for preselection of servo or tracer control as respects the individual motor, hydraulic shifter means for the respective valves and a control circuit interconnecting said hydraulic shifter means for the respective preselection valves and the tracer valve whereby movement of the tracer valve into circuit completing position will effect shifting of both selector valves to effect coupling of the respective motor circuits with the respective tracer controlled operating circuits.

19. A control mechanism for a machine tool having a pair of elements mounted for movement in angularly related paths, said mechanism including a hydraulic driving motor individual to each of said elements, a source of hydraulic actuating medium under pressure, a pair of conduits coupled to one of said motors, a tracer valve mechanism intervening the hydraulic medium source and said conduits, said valve mechanism including a deflectable tracer and a tracer valve displaceable by the tracer to increase the pressure in one of said conduits relative to the other whereby said one conduit is effective as a forward pressure input conduit for motor actuation, a forward pressure input conduit and a return pressure conduit for the second motor, a valve in said return pressure conduit providing a throttle for the return pressure flow from the second motor, a pair of opposed pistons for determining the position of the throttle valve, and means for hydraulically connecting said pistons with the forward pressure conduits of the respective motors whereby the effective differential between the pressures in said forward pressure conduits will determine the effective position of said return flow throttling valve.

20. A control mechanism for a machine tool having a pair of elements mounted for movement in angularly related paths, said mechanism including a hydraulic driving motor individual to each of said elements, a source of hydraulic actuating medium under pressure, a pair of conduits coupled to one of said motors, a tracer valve mechanism intervening the hydraulic medium source and said conduits, said valve mechanism including a deflectable tracer and a tracer valve displaceable by the tracer to increase the pressure in one of said conduits relative to the other whereby said one conduit is effective as a forward pressure input conduit for motor actuation, a forward pressure input conduit and a return pressure conduit for the second motor, a valve in said return pressure conduit providing a throttle for the return pressure flow from the second motor, a pair of opposed pistons for determining the position of the throttle valve, means for hydraulically connecting said pistons with the forward pressure conduits of the respective motors whereby the effective differential between the pressures in said forward pressure conduits will determine the effective position of said return flow throtting valve, the piston member connected with the tracer valve controlled forward pressure conduit having a greater area than the piston connected with the forward pressure conduit of the second motor whereby for equal pressures said piston member of larger area will dominate in determining the position of the throttle valve.

ERWIN G. ROEHM.

References Cited in the file of this patent

UNITED STATES PATENTS

| Number | Name | Date |
|---|---|---|
| 1,998,939 | Mittag | Apr. 23, 1935 |
| 2,006,121 | Thain | June 25, 1935 |
| 2,025,748 | Howe | Dec. 31, 1935 |
| 2,120,196 | Wright | June 7, 1938 |
| 2,373,332 | O'Neill | Apr. 10, 1945 |
| 2,456,158 | Tancred | Dec. 14, 1948 |